(12) United States Patent
Russ et al.

(10) Patent No.: US 8,641,379 B2
(45) Date of Patent: Feb. 4, 2014

(54) HYBRID RAM AIR TURBINE

(75) Inventors: David Everett Russ, Rockford, IL (US); Michael E. Larson, Jr., Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 830 days.

(21) Appl. No.: 12/826,904

(22) Filed: Jun. 30, 2010

(65) Prior Publication Data

US 2011/0236218 A1 Sep. 29, 2011

Related U.S. Application Data

(60) Provisional application No. 61/317,112, filed on Mar. 24, 2010.

(51) Int. Cl.
*B64D 41/00* (2006.01)
(52) U.S. Cl.
USPC ........................................... 416/142
(58) Field of Classification Search
USPC ........... 415/124.1; 416/11, 87, 142, 205, 246, 416/DIG. 4, DIG. 6
See application file for complete search history.

(56) References Cited

U.S. PATENT DOCUMENTS

| | | | |
|---|---|---|---|
| 3,633,411 A * | 1/1972 | Bass et al. | 73/112.01 |
| 4,742,976 A | 5/1988 | Cohen | |
| 4,991,796 A | 2/1991 | Peters et al. | |
| 5,122,036 A | 6/1992 | Dickes et al. | |
| 5,145,324 A | 9/1992 | Dickes et al. | |
| 5,487,645 A | 1/1996 | Eccles | |
| 5,564,903 A | 10/1996 | Eccles et al. | |
| 6,331,099 B1 | 12/2001 | Eccles et al. | |
| 6,580,179 B2 | 6/2003 | Eccles et al. | |
| 6,676,379 B2 | 1/2004 | Eccles et al. | |
| 7,077,631 B2 | 7/2006 | Eccles et al. | |
| 2003/0011198 A1 | 1/2003 | Eccles et al. | |
| 2007/0160460 A1 | 7/2007 | Eccles et al. | |

FOREIGN PATENT DOCUMENTS

GB 2257477 * 1/1993

* cited by examiner

*Primary Examiner* — Edward Look
*Assistant Examiner* — Liam McDowell
(74) *Attorney, Agent, or Firm* — Carlson, Gaskey & Olds, P.C.

(57) ABSTRACT

An example a ram air turbine assembly (RAT) is mounted to an airframe and provides both electric power and hydraulic pressure. A turbine drives a drive shaft about an axis transverse to rotation of the turbine. The drive shaft in turn drives both a generator and a hydraulic pump at a common speed.

20 Claims, 4 Drawing Sheets

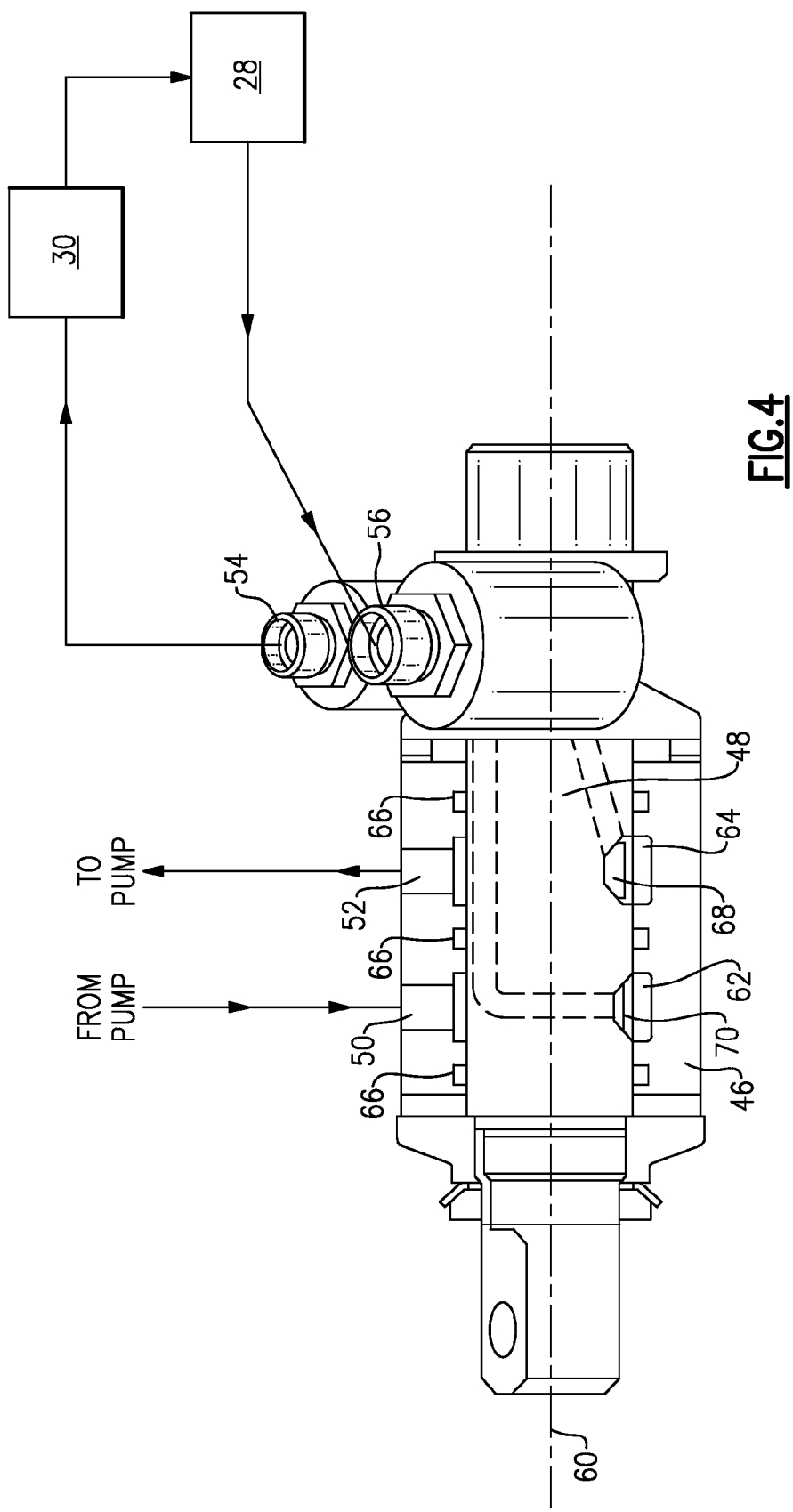

HYBRID RAM AIR TURBINE

This disclosure claims priority to U.S. Provisional Application No. 61/317,112 which was filed on Mar. 24, 2010.

BACKGROUND

This disclosure generally pertains to ram air turbines utilized to provide emergency power for an aircraft. More particularly, this disclosure relates to a ram air turbine for supplying both electric and hydraulic power to an aircraft.

A ram air turbine is used to generate supplemental power in an aircraft by extracting power from an air stream along the exterior of the aircraft during flight. The ram air turbine includes a turbine that drives an electric motor or hydraulic pump that is suspended on a strut assembly. In operation, the turbine is moved from a stowed position within the aircraft to a position that provides clearance for blades of the turbine and the aircraft. The turbine is mounted at the end of a strut and drives a turbine drive shaft that in turn drives the electric motor or hydraulic pump.

SUMMARY

A disclosed example ram air turbine assembly (RAT) is mounted to an airframe and provides both electric power and hydraulic pressure. The example RAT includes a turbine that rotates responsive to air flow along the outside of the airframe. The turbine is supported at the end of a strut attached to generator housing. The generator housing is mounted for rotation to the airframe with a swivel post. A generator operating within the generator housing also drives a hydraulic pump. The generator generates electric power that can be supplied to an aircraft system and the hydraulic pump provides pressurized fluid to various systems that utilize pressurized fluid for operation.

The turbine rotates about an axis and drives a gearbox. The gearbox drives a drive shaft that rotates about an axis that is transverse to the turbine. The drive shaft extends from the gearbox through the strut to the generator. The hydraulic pump is coupled to the generator such that the hydraulic pump rotates about the axis common with the generator at a speed common with the generator. Hydraulic connections for the pump are provided through a swivel post. The swivel post includes fixed and rotating parts that communicate hydraulic fluid between the hydraulic pump and desired onboard hydraulic systems.

These and other features disclosed herein can be best understood from the following specification and drawings, the following of which is a brief description.

BRIEF DESCRIPTION OF THE DRAWINGS

FIG. 4 is a sectional view of the example swivel post.

DETAILED DESCRIPTION

Figure 1:
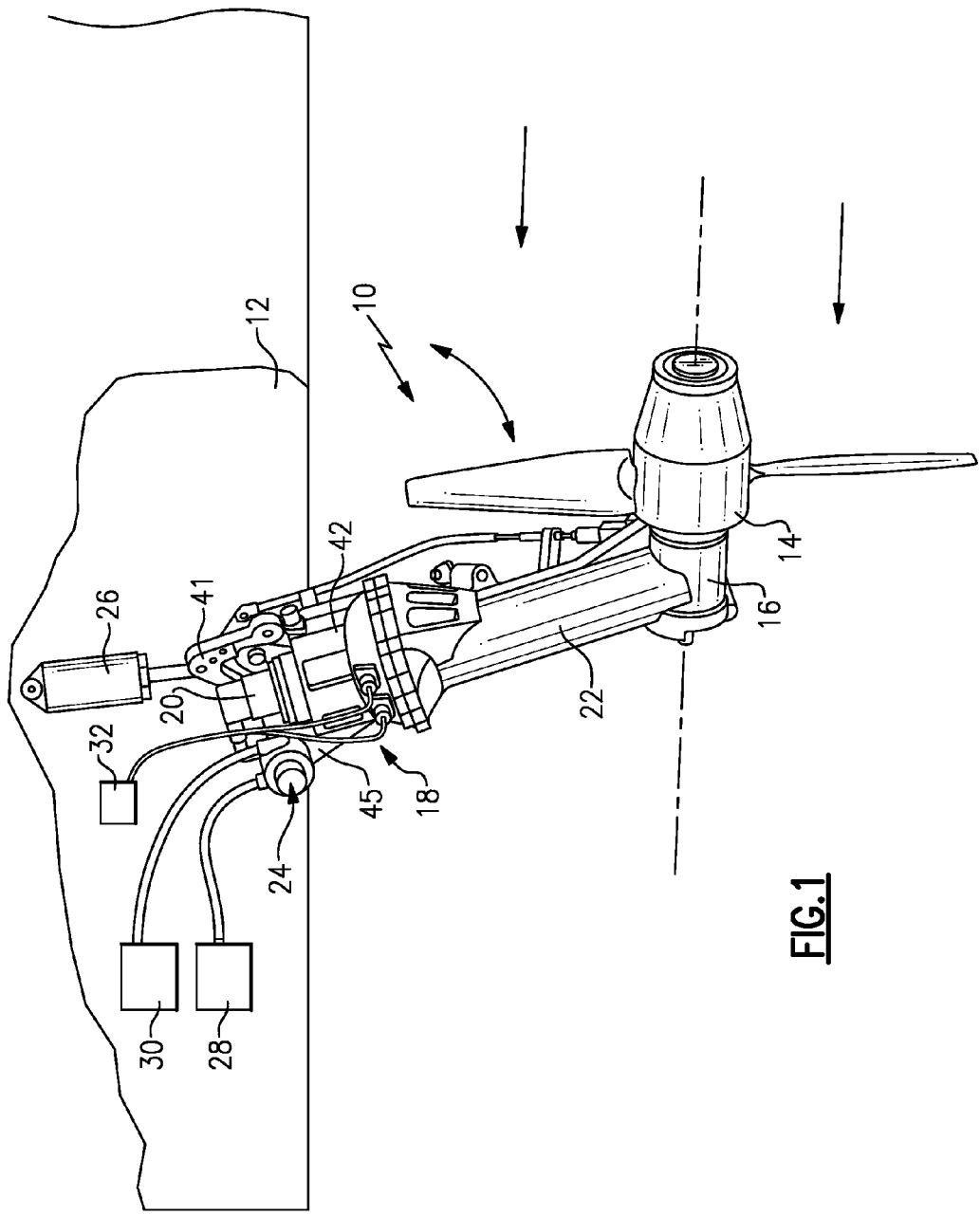
FIG. 1 is a schematic view of an example ram air turbine including a generator and a hydraulic pump.
Figure 2:
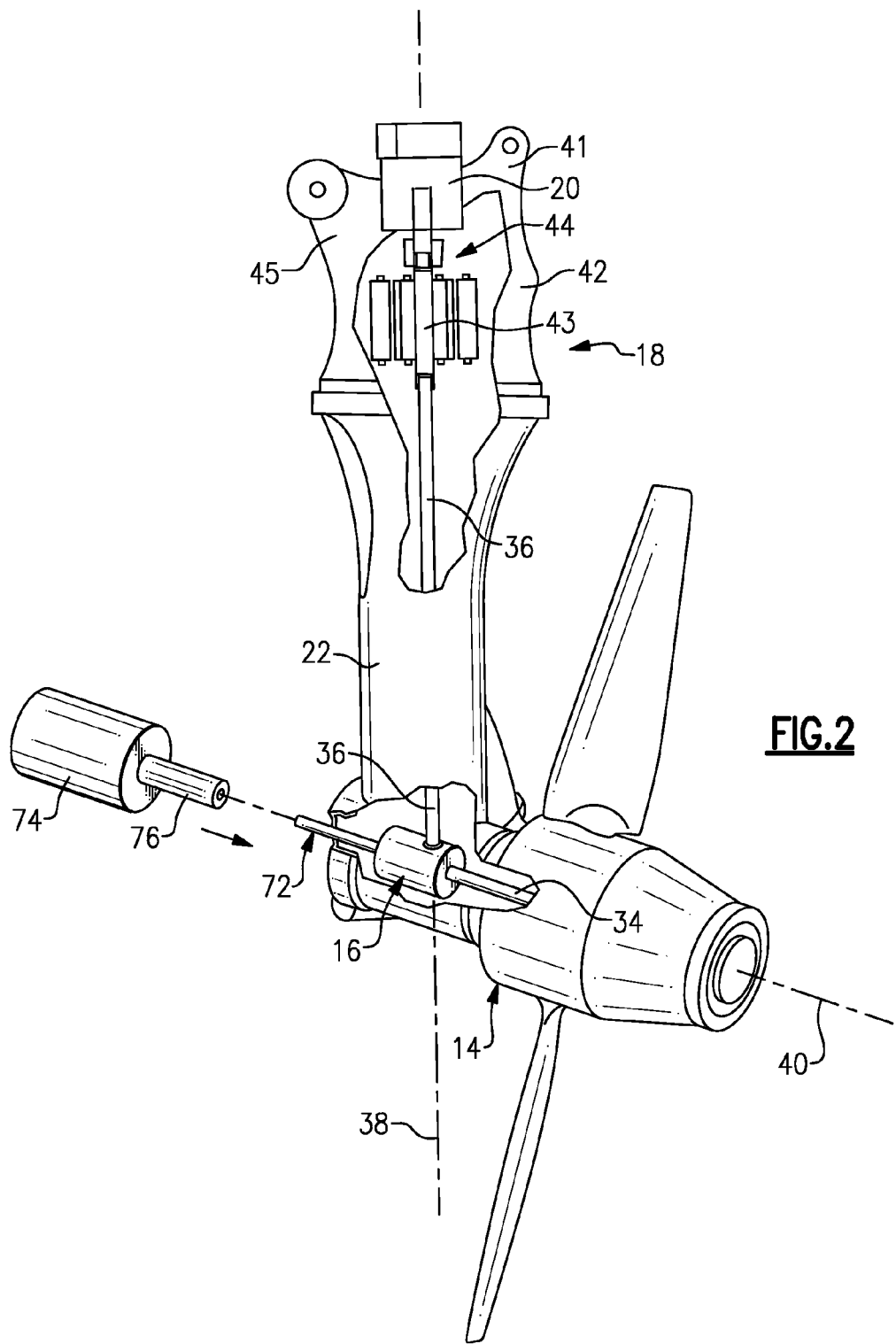
FIG. 2 is a sectional view of the example ram air turbine.

Referring to FIGS. 1 and 2, an example ram air turbine assembly (RAT) 10 is mounted to an airframe 12 and is deployable to provide both electric power and hydraulic pressure. The example RAT 10 includes a turbine 14 that rotates responsive to air flow along the outside of the airframe 12. The turbine 14 is supported at the end of strut 22 attached to a generator housing 42. The generator housing 42 is mounted for rotation to the airframe 12 with a swivel post 24. A generator 18 is disposed within the generator housing 42 and is coupled to a hydraulic pump 20. The generator 18 generates electric power that can be supplied to an aircraft system such as is schematically indicated at 32. The hydraulic pump 20 receives fluid from a fluid supply 28 and pumps the fluid to various systems indicated at 30 that utilize pressurized fluid for operation.

The turbine 14 rotates to drive a turbine shaft 34 about an axis 40. The turbine shaft 34 drives a gearbox 16. The example gearbox 16 is disposed just behind the turbine 14 and along the axis 40 of rotation of the turbine 14 and turbine shaft 34. The example gearbox 16 drives a drive shaft 36 that rotates about an axis 38 that is transverse to the axis 40. The drive shaft 36 extends from the gearbox 16 through the strut 22 to the generator 18. The drive shaft 36 is coupled to drive the generator 18 at a desired speed. The example gearbox 16 includes gears that provide a desired ratio of rotational speed between the turbine shaft 34 and the drive shaft 36. In this example, the drive shaft 36 is rotated at a greater speed then the turbine shaft 34. Moreover, the gearbox 16 can be configured to provide any desired speed ratio relative to rotation of the turbine 14.

The speed at which the drive shaft 36 is rotated is determined to provide the desired rotational speed required to drive the generator 18 and produce a desired amount of electrical energy at the desired frequency. The electrical energy produced by the generator 18 is then transmitted to the aircraft system schematically indicated at 32. The hydraulic pump 20 is coupled to the generator 18 such that the hydraulic pump 20 rotates at the same speed as the generator 18. A coupling 44 between the hydraulic pump 20 and the generator 18 provides a direct drive connection such that both the generator 18 and the hydraulic pump 20 are concurrently driven at a common speed. In this example the coupling 44 includes a splined connection directly to the generator shaft 43. As appreciated other coupling configurations are within the contemplation of this disclosure for connecting the hydraulic pump 20 to the generator 18. Because the hydraulic pump 20 is driven at the same speed as the generator 18, no additional gearbox is required to modify shaft speed to operate the hydraulic pump 20. Moreover, the hydraulic pump 20 communicates pressurized fluid to the aircraft systems 30 at the same time as the generator 18 produces electric power.

The generator 18 is supported within the generator housing 42 at an end distal from the turbine 14. The generator housing 42 includes a mounting bracket 41 and an integral swivel bracket 45. The mounting bracket 41 attaches to an actuator 26. The actuator 26 drives movement of the RAT 10 between a stowed position within the airframe 12 and the deployed position schematically shown in FIG. 1.

The swivel bracket 45 mounts to the swivel post 24 to support the RAT 10. The strut 22 is attached to the generator housing 42 and thereby moves with the pivoting movement of the generator housing 42. The hydraulic pump 20 is mounted to the generator housing 42 and therefore also rotates with the generator housing 42 during movement to the deployed position.

Referring to FIG. 2, a coupling shaft 72 extends from the gear box 16 and is accessible from a back side of the strut 22. The coupling shaft 72 is provided with a configuration that mates to a driven shaft 76 of a removable hydraulic motor 74. The removable hydraulic motor 74 provides for rotation of the coupling shaft 72, and thereby the gear box 16 to test operation of the RAT 10 in non-flight conditions. Although a hydraulic motor is shown by example, other motor such as an electric motor could be utilized to back drive the RAT 10. Operation of the RAT 10 can be verified by turning the coupling shaft 72 at a desired speed to simulate operation while in the air. Because the generator 18 and hydraulic pump 20 are not inline with the turbine 14, the coupling shaft 72 is easily accessible without additional mechanisms or and additional gear box.

During maintenance operations, the driven shaft 76 of the removable hydraulic motor 74 is coupled to the coupling shaft 72. The removable hydraulic motor 74 is utilized to drive turbine 14 and gearbox 16, and thereby the generator 18 and the hydraulic pump 20. The turbine 14, generator 18 and hydraulic pump 20 performance can then be verified without deploying the RAT 10 in flight.

Figure 3:
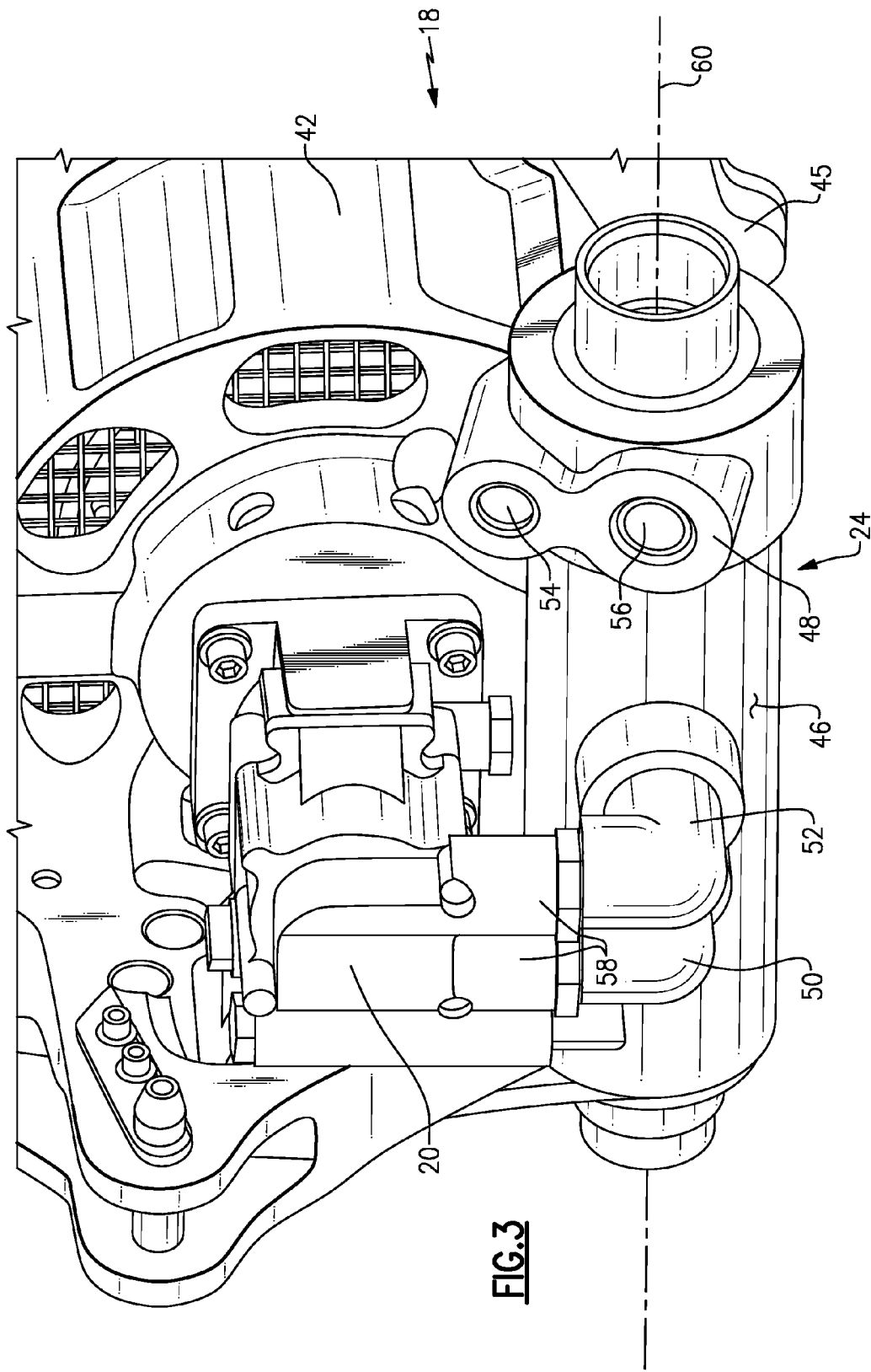
FIG. 3 is a perspective view of an example hydraulic pump mounted to a generator and supported by a swivel post supporting the example ram air turbine.

Referring to FIGS. 3 and 4, the example swivel post 24 includes a stationary or fixed portion 48 that supports a rotating housing 46. The swivel post 24 provides for movement of the RAT 10 about the axis 60 between deployed and stowed positions. The rotating housing 46 includes the pump discharge outlet 50 and inlet 52 that are in communication through conduits 58 with the hydraulic pump 20. The fixed portion 48 includes the pump outlet 54 and the inlet 56. The rotating housing 46 includes first and second annular passages 62 and 64 that are in communication with a corresponding one of the discharge outlet 50 and inlet 52. The fixed portion 48 includes ports 68 and 70 that are in communication with the corresponding annular passages 62 and 64. The ports 68, 70 are in turn in fluid communication by way of passages with one of the outlet 54 and inlet 56. Seals 66 provide a fluid seal between the rotating housing 46 and the fixed portion 48 to isolate flow through the separate annular passages 62, 64. By providing fluid flow through the swivel post 24 between the rotating housing 46 and the fixed portion 48 the example swivel post 24 eliminates the need for flexible hoses between fixed and rotating parts of the RAT 10.

Fluid flow from the fluid supply 28 is supplied to the hydraulic pump 20 through the inlet 56, then through the passage that leads to the port 68. From the port 68 fluid is communicated through the annular passage 64 through the inlet 52 and to the hydraulic pump 20 through the fixed conduit 58. Pressurized fluid is then fed from the hydraulic pump 20 through another of the fixed conduits 58 through the discharge outlet 50 and into the annular passage 62. From the annular passage 62 fluid is fed through the port 70 and to the outlet 54 to the desired aircraft hydraulic system 30. Hydraulic fluid is returned to the supply through appropriately configured return fluid conduits.

Accordingly, the example RAT 10 provides inline power generation with a single gearbox 16 that drives both the generator 18 and the hydraulic pump 20. Moreover, mounting of the generator 18 and hydraulic pump 20 at or substantially near the swivel post 24 provides for a lighter RAT 10 configuration. Mounting of the hydraulic pump 20 near the swivel post 24 simplifies routing of hydraulic conduits and houses. The example swivel post 24 further provides for the substantial elimination of flexible conduits by directing hydraulic fluid between rotating and stationary parts.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A ram air turbine assembly comprising:
    a strut movable about a pivot axis between a deployed position and a stowed position;
    a turbine supported by the strut;
    a drive shaft rotatable about a first axis transverse to a rotation axis of the turbine and the pivot axis;
    a generator driven by the drive shaft; and
    a hydraulic pump driven by the drive shaft, wherein the drive shaft, generator and hydraulic pump are all movable with the strut between the deployed and stowed positions and are all aligned about the first axis transverse to the rotation axis of the turbine.

2. The ram air turbine assembly as recited in claim 1, including a turbine shaft driven by the turbine, wherein the drive shaft is driven by the turbine shaft through a gearbox.

3. The ram air turbine assembly as recited in claim 2, wherein the gearbox increases rotational speed of the drive shaft relative to the rotational speed of the turbine shaft.

4. The ram air turbine assembly as recited in claim 2, wherein the gearbox includes a coupling shaft for back driving the turbine, generator and hydraulic pump.

5. The ram air turbine assembly as recited in claim 1, including a coupling between the generator and the hydraulic pump.

6. The ram air turbine assembly as recited in claim 5, wherein the coupling comprises a splined connection directly to a generator shaft.

7. The ram air turbine assembly as recited in claim 1, including a swivel post supporting movement of the strut about the pivot axis between stowed and deployed positions, the swivel post including passages for communicating hydraulic fluid to the hydraulic pump.

8. The ram air turbine assembly as recited in claim 7, wherein the swivel post includes a rotatable portion in fluid communication with a fixed portion.

9. The ram air turbine assembly as recited in claim 8, wherein the rotatable portion includes openings that communicate with passages within the fixed portion.

10. A ram air turbine assembly comprising:
    a generator supported within a generator housing;
    a strut mounted to the generator housing, wherein the strut and generator housing are rotatable about an axis of rotation between a deployed position and a stowed position;
    a gearbox supported on the strut;
    a turbine driving the gearbox;
    a drive shaft driven by the gearbox and extending through the strut to drive the generator; and
    a hydraulic pump movable with the generator between the deployed and stowed positions, wherein the hydraulic pump is coupled to a shaft of the generator such that both the generator and hydraulic pump rotate at a common speed; and
    a swivel post that supports movement of the generator and strut about the axis of rotation, wherein the swivel post includes fluid passages for communicating hydraulic fluid between the movable hydraulic pump and a static structure.

11. The ram air turbine assembly as recited in claim 10, wherein the generator and the hydraulic pump are driven about an axis common to the drive shaft driven by the gearbox.

12. The ram air turbine assembly as recited in claim 10, wherein the swivel post includes a fixed portion and a rotatable portion, the rotatable portion including at least one opening that communicates fluid to at least one passage in the fixed portion.

13. The ram air turbine assembly as recited in claim 10, wherein the gearbox and turbine are mounted on a distal end of the strut relative to the generator.

14. The ram air turbine assembly as recited in claim 10, wherein the swivel post includes a rotatable portion including annular channels in communication with openings defined within a fixed portion.

15. The ram air turbine assembly as recited in claim 14, wherein the rotatable portion is received within the fixed portion.

16. The ram air turbine assembly as recited in claim 14, wherein the annular channels include an inlet channel and an outlet channel and the openings defined in the fixed portion include an inlet opening in fluid communication with the inlet channel and an outlet opening in fluid communication with the outlet channel.

17. A method of providing emergency power in an aircraft including the steps of:

driving a drive shaft along a first axis transverse to a rotation axis of a turbine shaft driven by a turbine; and driving a generator and hydraulic pump with the drive shaft at a common speed about the first axis, wherein the drive shaft, generator and hydraulic pump are all movable about a pivot axis with a strut between a deployed and a stowed position and are all aligned about a first axis transverse to the rotation axis of the turbine and the pivot axis.

18. The method as recited in claim 17, including coupling the hydraulic pump to the generator for rotating the hydraulic pump at the common speed.

19. The method as recited in claim 17, including increasing a speed of the drive shaft relative to a speed of the turbine shaft.

20. The method as recited in claim 17, including routing hydraulic fluid through a swivel post, wherein the swivel post supports movement between deployed and stowed positions.

* * * * *